United States Patent
Kuo et al.

(10) Patent No.: US 7,493,035 B2
(45) Date of Patent: Feb. 17, 2009

(54) METHOD FOR FOCUSING BY USING A PRE-FLASH

(75) Inventors: Lee-Ren Kuo, Taipei (TW); Jian-Yu Lin, Taipei (TW); Feng-Chi Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 483 days.

(21) Appl. No.: 11/163,714

(22) Filed: Oct. 28, 2005

(65) Prior Publication Data

US 2006/0216012 A1    Sep. 28, 2006

(30) Foreign Application Priority Data

Mar. 22, 2005    (TW) .............. 94108738 A

(51) Int. Cl.
*G03B 13/00*    (2006.01)
*G03B 17/00*    (2006.01)

(52) U.S. Cl. ....................... 396/106; 396/80

(58) Field of Classification Search ............ 396/77, 396/80, 106, 157; 348/345, 348, 349, 350
See application file for complete search history.

(56) References Cited

U.S. PATENT DOCUMENTS

| | | | | |
|---|---|---|---|---|
| 5,128,529 A | * | 7/1992 | Nagaoka et al. | 250/201.6 |
| 6,700,614 B1 | * | 3/2004 | Hata | 348/345 |
| 7,071,986 B2 | * | 7/2006 | Kobayashi et al. | 348/353 |
| 7,126,640 B1 | * | 10/2006 | Takei | 348/371 |
| 7,295,243 B2 | * | 11/2007 | Hata | 348/371 |
| 2003/0043290 A1 | * | 3/2003 | Sasaki | 348/345 |

FOREIGN PATENT DOCUMENTS

TW    486603    5/2002

\* cited by examiner

*Primary Examiner*—Rodney E Fuller
(74) *Attorney, Agent, or Firm*—Jianq Chyun IP Office

(57) ABSTRACT

A method for focusing by using a pre-flash is provided. The method includes the following steps. First, the image sensor captures a first image of the object, wherein the average brightness of the first image is calculated to be $Y_0$. Next, the image sensor captures a second image of the object with the aid of a first pre-flash having a first energy, wherein the average brightness of the second image is calculated to be $Y_1$. Afterwards, the image sensor captures a third image of the object with the aid of a second pre-flash having a second energy, wherein the average brightness of the third image is calculated to be $Y_2$. Then, the distance D to the object is calculated according to the brightness $Y_0$ and the difference $\Delta Y$ between $Y_1$ and $Y_2$. Finally, the image sensor adjusts the focus according to the distance D.

10 Claims, 4 Drawing Sheets

METHOD FOR FOCUSING BY USING A PRE-FLASH

CROSS-REFERENCE TO RELATED APPLICATION

This application claims the priority benefit of Taiwan application serial no. 94108738, filed on Mar. 22, 2005. All disclosure of the Taiwan application is incorporated herein by reference.

BACKGROUND OF THE INVENTION

1. Field of the Invention

The present invention relates to an automatic focusing method, and particularly to a method for focusing by using a pre-flash.

2. Description of Related Art

Nowadays, the technology of digital cameras and digital camcorders is ever-developing, and the conventional disadvantages such as complicated operation and poor portability in the conventional cameras or analogue camcorders are improved. Nearly all the recent digital cameras have built-in auto-focus mode and multiple manual focus modes provided for the users to properly focus the object. Also, without auxiliary focusing system to measure the distance, a conventional digital camera operating in a dark environment or insufficient light in the indoors could easily lose focus when using only the brightness data obtained from the image sensor. Therefore, some newly developed auxiliary focusing systems mounted with, for example, projection focus auxiliary light or even infrared focus function, are introduced. Unfortunately, such high-end digital cameras are rather costly.

An auto-focus complementary device is disclosed to use a red-eye-reduction means as an auxiliary focusing device, and the method thereof is disclosed therewith. As shown in FIG. 1, the method includes the following steps. Firstly, at step S401, a flash module flashes and provides red-eye-reduction function. Next, at step S402, it is determined whether the brightness provided is proper or not. If it is too dark, then set the focus to a predetermined far position, for example, 3 meters away (as shown in step S406). If it is too bright, then move the focus to a predetermined near position, for example, 1 meter away (as shown in step S405). If the brightness is proper, then roughly adjust the focus of the image capturing means according to the focus data captured by the image sensor at step S403. Afterward, capture the estimated focus of the object sequentially to finely adjust the focus as the red-eye-reduction means flashes sequentially at step S404.

Nevertheless, the red-eye-reduction means is only adapted to short-distance shots for facial expression. As to other short-distance shots for, such as pictures or articles, the auto-focusing effect is not obvious, especially those under insufficient indoor light. Furthermore, the brightness sensed by the image sensor is not equal to the brightness sensed by the red-eye-reduction means when it flashes. And whenever the red-eye-reduction means flashes, the auto-focus module would finely adjust the focus, sometimes even up to four or five times, which is time consuming and power wasting.

SUMMARY OF THE INVENTION

In view of the above, an object of the present invention is to provide a method for focusing by using a pre-flash for enhancing focusing accuracy without adding extra devices.

Another object of the present invention is to provide a method for focusing by using a pre-flash for shortening focus adjusting time and saving power.

The present invention provides a method for focusing by using a pre-flash. The method includes the following steps. First, the image sensor captures a first image of an object, wherein the average brightness of the first image is calculated to be $Y_0$. Next, the image sensor captures a second image of the object with the aid of a first pre-flash having a first energy, wherein the average brightness of the second image is calculated to be $Y_1$. Afterward, the image sensor captures a third image of the object with the aid of a second pre-flash having a second energy, wherein the average brightness of the third image is calculated to be $Y_2$. Then, calculate the distance D to the object according to the brightness $Y_0$ and the difference $\Delta Y$ between $Y_1$ and $Y_2$. Finally, the image sensor adjusts the focus according to the distance D.

According to an embodiment of the invention, $Y_0$ is, for example, smaller than a predetermined minimum $Y_L$, and the first energy is not equal to the second energy.

According to an embodiment of the invention, the distance D to the object can be obtained by either checking a conversion table that records a corresponding value of D with respect to $Y_0$ and $\Delta Y$, or calculating from an equation that represents the relationship between D, $Y_0$, and $\Delta Y$, wherein the conversion table or the equation are obtained from previous collected experiment data, for example.

According to an embodiment of the invention, the method further includes obtaining a reflection ratio R of the third image for calculating the distance D to the object according to $Y_0$, $\Delta Y$ and the reflection ratio R. The relationship between $Y_0$, $\Delta Y$, the reflection ratio R and the distance D to the object is obtained from previously collected experiment data, for example. In addition, the reflection ratio R is the ratio of the area in the third image having brightness greater than a predetermined value $Y_T$ to the whole area of the third image. The predetermined value $Y_T$ is obtained from previous collected experiment data, for example.

Instead of adding extra expensive auxiliary focusing module or modifying the original system structure with extra budget, the present invention employs the pre-flash function to obtain the distant D to the object to be photographed, by which the image sensor can improve the focusing accuracy to measure the distance to the object to be photographed under insufficient indoor light for capturing a clear image.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

According to an embodiment of a method for focusing by using a pre-flash of the present invention, $Y_0$ is preferred to be smaller than a predetermined minimum $Y_L$. According to the embodiment of the method for focusing by using a pre-flash of the present invention, the first energy is preferred to be substantially unequal to the second energy. According to the embodiment of the method for focusing by using a pre-flash of the present invention, the distance D to the object corresponding to $Y_0$ and $\Delta Y$ can be obtained by either checking a conversion table, or calculating from an equation. It is more preferred that the conversion table or the equation is obtained from previously collected experiment data. According to the embodiment of the method for focusing by using a pre-flash of the present invention, the distance D to the object is preferred to be obtained from $Y_0$, $\Delta Y$ and the reflection ratio R. Preferably, the relationship between the $Y_0$, $\Delta Y$, the reflection ratio R and the distance D to the object is obtained from previously collected experiment data, wherein the reflection ratio R represents the ratio of the area in the third image having brightness greater than a predetermined value $Y_T$ to the whole area of the third image. Preferably, the predetermined value $Y_T$ is obtained from previously collected experiment data, for example.

Figure 1:
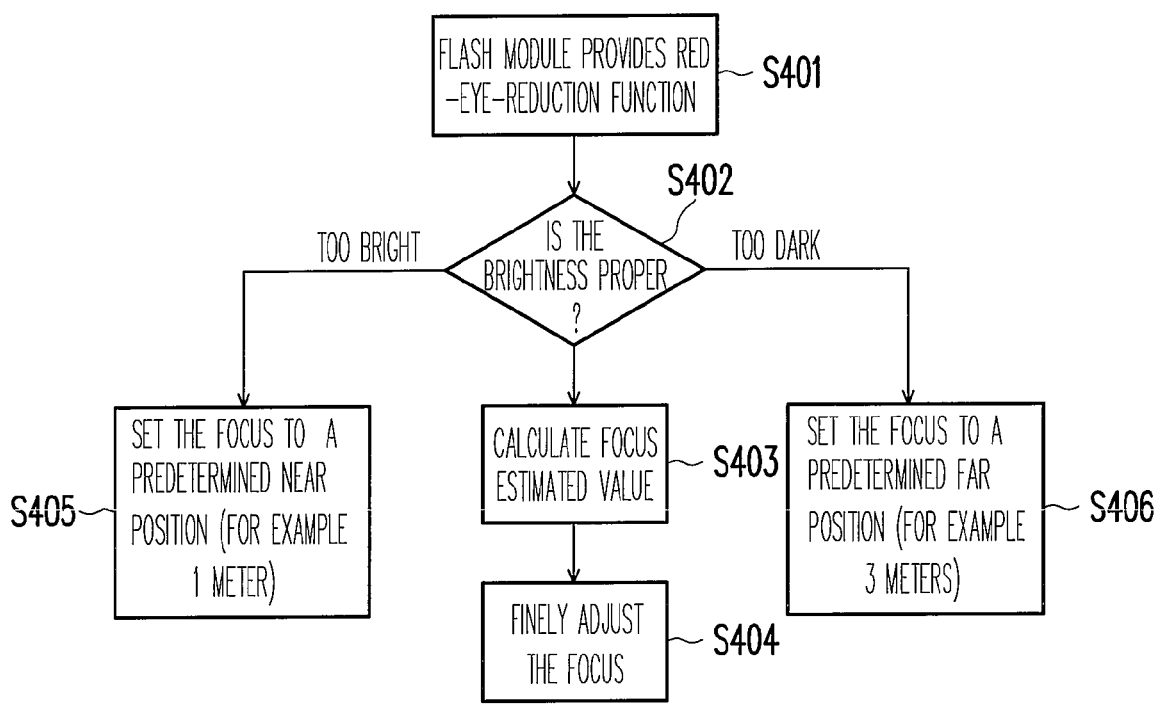
FIG. 1 is a flowchart of an auto-focus complementary device using an red-eye-reduction means as an image capturing device shown in the prior art.
Figure 2:
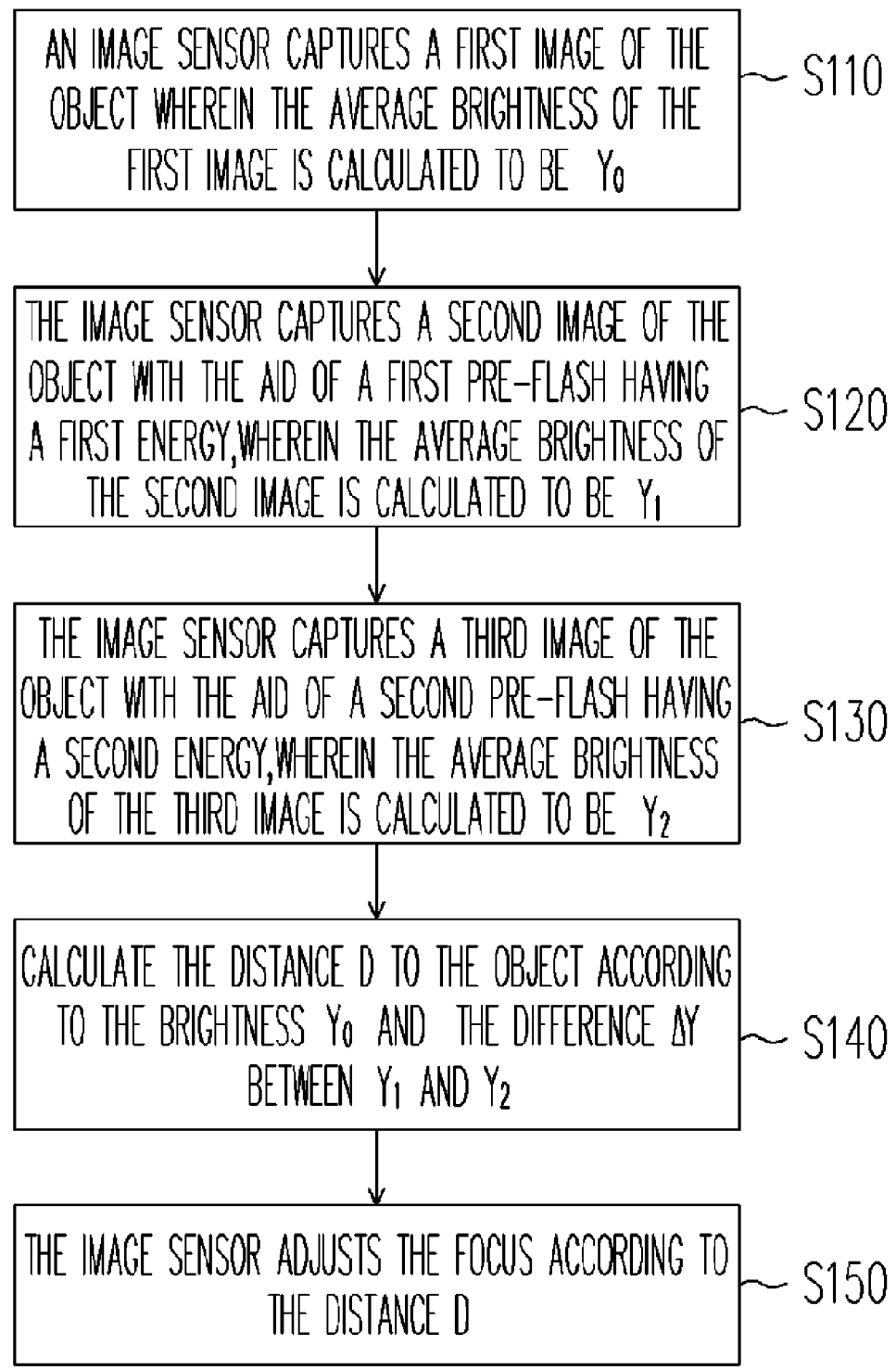
FIG. 2 is a flowchart diagram of a method for focusing by using a pre-flash according to an embodiment of the present invention.

FIG. 2 is a flowchart of a method for focusing by using a pre-flash according to an embodiment of the present invention. Referring to FIG. 2, the method for focusing by using a pre-flash includes the following steps. First, at step S110, the image sensor captures a first image of an object, wherein the average brightness of the first image is calculated to be $Y_0$. Then, at step S120, the image sensor captures a second image of the object with the aid of a first pre-flash having a first energy, wherein the average brightness of the second image is calculated to be $Y_1$. Afterward, at step S130, the image sensor captures a third image of the object with the aid of a second pre-flash having a second energy, wherein the average brightness of the third image is calculated to be $Y_2$. Subsequently, at steps S140 and S150, the distance D to the object is calculated according to the brightness $Y_0$ and the difference $\Delta Y$ between $Y_1$ and $Y_2$, and then the image sensor adjusts the focus according to the distance D.

In the foregoing step S110, the image sensor calculates the average brightness $Y_0$ of the first image by previewing an image of the object to be photographed, for example. When an image capturing device (such as a digital camera) is operating, the previewing function can be started by an internal image sensor module. The previewing function includes evaluating the environment brightness, fundamentally judging the distance to the object to be photographed, and displaying the obtained environmental brightness and distance to the object on an image window (such as an LCD window) for the users reference.

The foregoing steps S120 to S150 of the focusing process using a pre-flash are performed step by step as follows. The process is especially adapted to the condition when the average brightness $Y_0$ is smaller than a predetermined minimum $Y_L$. At step S120, with the aid of a first pre-flash having a first energy, the image sensor captures the second image of the object and calculates average brightness $Y_1$ of the second image. At step S130, with the aid of a second pre-flash having a second energy, the image sensor again captures the third image of the object and calculates the average brightness $Y_2$ of the third image. The first energy is relatively lower then the second energy so that the average brightness $Y_1$ is lower than the average brightness $Y_2$ i.e. ($Y_1 < Y_2$). However, in another embodiment, the first energy may be higher than the second energy so that the average brightness $Y_1$ is higher than the average brightness $Y_2$ i.e. ($Y_1 > Y_2$).

Figure 3:
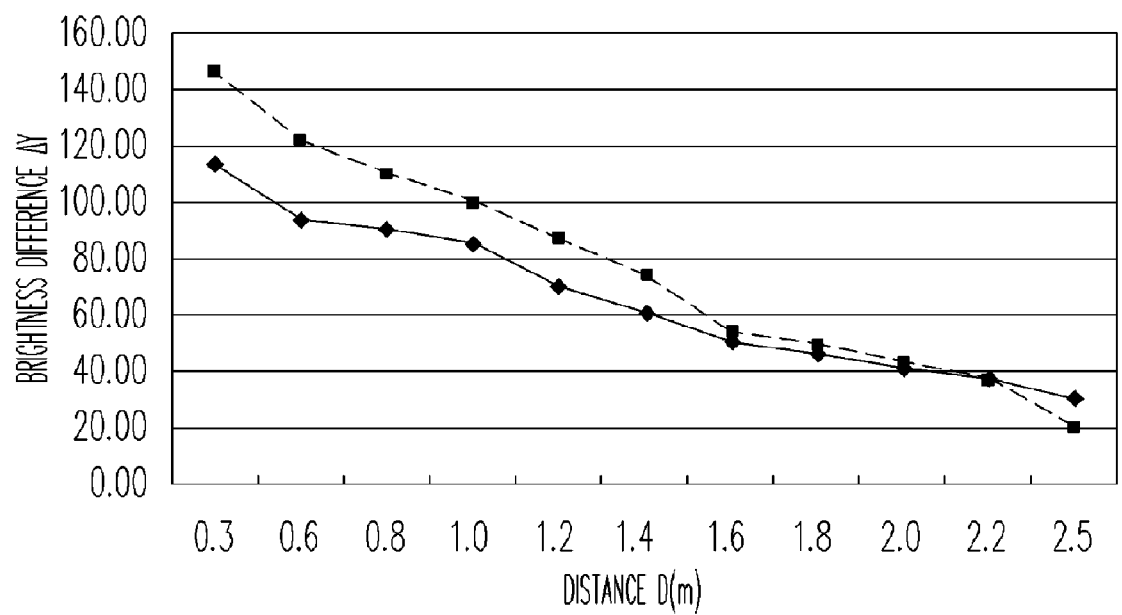
FIG. 3 is a curve diagram of the relationship between the difference $\Delta Y$ and the distance to the object to be photographed.

After that, the steps S140 and S150 are performed. At step S140, the difference $\Delta Y$ between the average brightness $Y_1$ and the average brightness $Y_2$ is calculated, wherein $\Delta Y = |Y_1 - Y_2|$, and the distance D to the object to be photographed is calculated according to the brightness $Y_0$ and the difference $\Delta Y$. The image sensor further adjusts the focus according to the distance D. Referring to FIG. 3, it is a curve diagram of the relationship between the difference $\Delta Y$ and the distance to the object to be photographed, wherein the y-axis represents the difference $\Delta Y$ between the average brightness $Y_1$ and the average brightness $Y_2$, the x-axis represents the distance D to the object. Each point on the real line represents the distances to the object corresponding to the difference $\Delta Y$ when the environment brightness is relatively high, whereas the each point on the dashed line represents the distance D to the object corresponding to the difference $\Delta Y$ when the environment brightness is relatively low.

According to an embodiment of the present invention, the foregoing experiment data can be previously built in a database of the digital capturing device, the embodiment including a rapid focusing process of obtaining the distance D to the object by either checking the corresponding value of $Y_0$ and $\Delta Y$ from a conversion table, or calculating the corresponding value of $Y_0$ and $\Delta Y$ by an equation. That is, the conversion table may record a corresponding value of D with respect to $Y_0$ and $\Delta Y$ from previously collected experiment data. The equation also may represent the relationship between D, $Y_0$, and $\Delta Y$ from previously collected experiment data.

Furthermore, the focusing process using pre-flash function may include obtaining a reflection ratio R. The reflection ratio R represents the ratio of the area in the third image having brightness greater than a predetermined value $Y_T$ to the whole area of the third image, and the predetermined value $Y_T$ is obtained, for example, from previously collected experiment data. In addition, the distance D to the object can be obtained from $Y_0$, $\Delta Y$ and the reflection ratio R, and the relationship between the $Y_0$, $\Delta Y$, the reflection ratio R and the distance D to the object is obtained from previously collected experiment data, for example.

Therefore, at step S150, the system may obtain the distance to the object to be photographed according to a built-in data checking table, and thus deduce an optimum focusing value for further adjusting the focus of the image sensor. In particular, the focus of the image sensor is adjusted once, but not multiple times.

Figure 4:
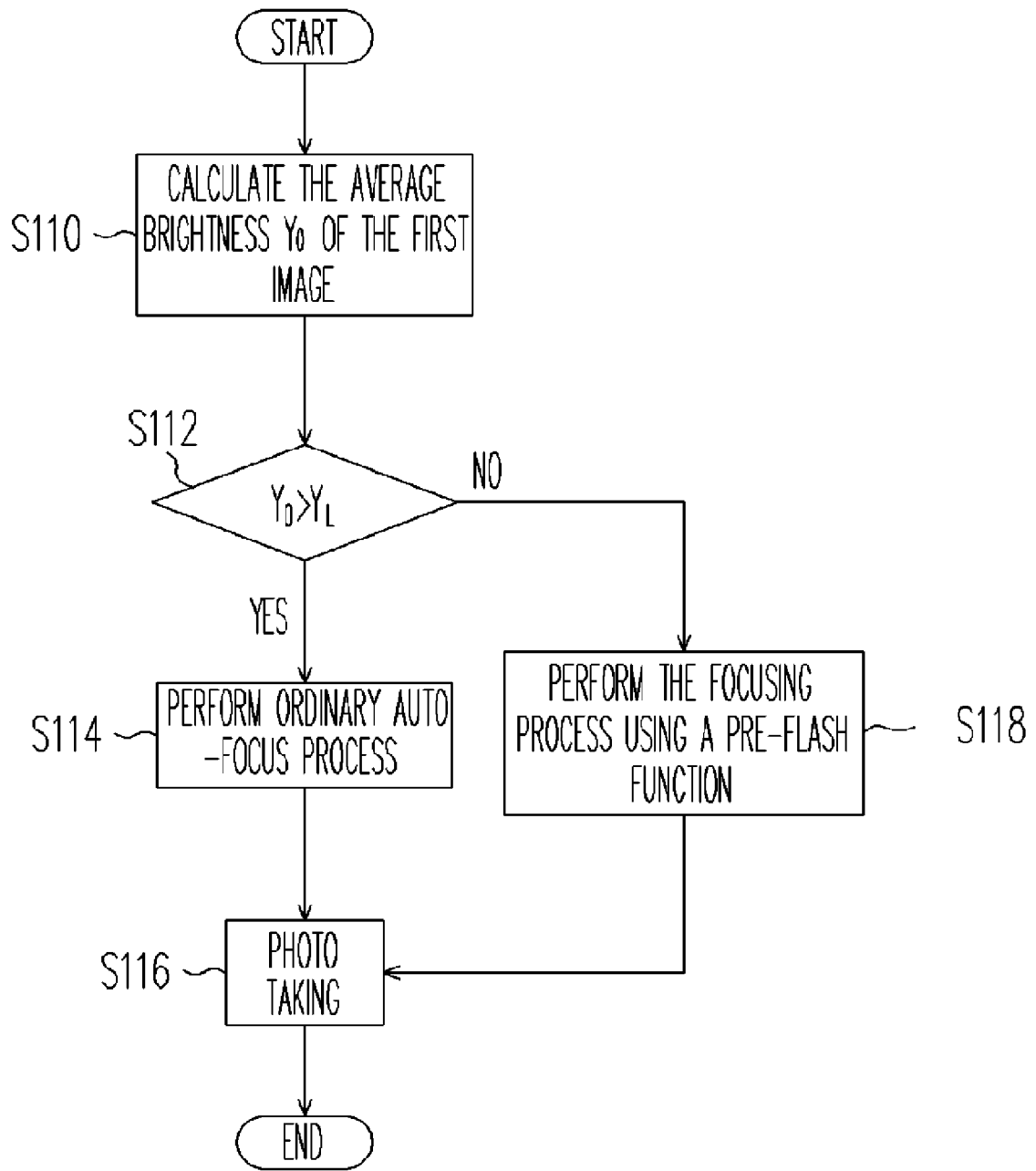
FIG. 4 is a schematic diagram of a focusing process conducted by a system employing a method for focusing by using a pre-flash according to an embodiment of the present invention.

FIG. 4 is a schematic diagram of a focusing process by a system employing a method for focusing by using a pre-flash according to the present invention. Referring to FIG. 4, the focusing process includes the following steps. First, at step S110, the average brightness $Y_0$ of the first image is calculated. When the average brightness $Y_0$ is greater than a predetermined minimum $Y_L$, perform an ordinary auto-focus process to adjust the focus as shown in steps S112 to S114, and then perform step S116 of photo taking, including pressing the shutter to start an image sensor to capture an image containing an object to be photographed for obtaining a clear image. When the average brightness $Y_0$ is smaller than the predetermined minimum $Y_L$, then perform the above-described focusing process using a pre-flash function as shown in steps S120 to S150 at step S118 for improving the focusing accuracy. Finally, go back to step S116 for photo taking to capture an image of the object to be photographed.

According to an embodiment of the present invention, the pre-flash function is performed with a flash of a digital camera. However, the pre-flash function can also be applied to other image capturing devices. Also, other built-in light sources or external light source module may be used for providing extra brightness, especially when the environment brightness is not enough. A flash is a necessary auxiliary light source. When using a flash as a focusing light source, not only the system structure of the original digital camera need not be modified, but also no extra component need be added. Therefore, the cost for installing other auxiliary focusing system or module can thus be efficiently reduced.

In view of the above, the present invention adopts a pre-flash function for deducing the distance to the object so that the image sensor can improve the focusing accuracy, even under insufficient environment light. In particular, the relationship between the distance to the object and the brightness difference can be obtained by checking a conversion table or calculating from an equation. With the method for focusing by using a pre-flash of the present invention, the focus of the image sensor needs only one time adjustment. In addition, the system structure of the original digital camera need not be modified, and no extra components should be added. Thus, the purpose of the invention can be achieved. Therefore, the cost will not increase.

It should be noted that specific embodiments of, and examples for, the invention are described herein for illustrative purposes, and various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An method for focusing by using a pre-flash, the method comprising the steps of:
   an image sensor capturing a first image of an object when the pre-flash does not emit light to the object, wherein the average brightness of the first image is calculated to be $Y_0$;
   when $Y_0$ is smaller than a predetermined minimum $Y_1$, the image sensor capturing a second image of the object with the aid of a first pre-flash having a first energy, wherein the average brightness of the second image is calculated to be $Y_1$;
   the image sensor capturing a third image of the object with the aid of a second pre-flash having a second energy, wherein the average brightness of the third image is calculated to be $Y_2$;
   calculating the distance D to the object according to the brightness $Y_0$ and the difference $\Delta Y$ between $Y_1$ and $Y_2$; and
   the image sensor adjusting the focus according to the distance D.

2. The method for focusing by using a pre-flash according to claim 1, wherein the first energy is not equal to the second energy.

3. The method for focusing by using a pre-flash according to claim 1, wherein the distance D to the object is obtained by checking a conversion table that records a corresponding value of D with respect to $Y_0$ and $\Delta Y$.

4. The method for focusing by using a pre-flash according to claim 3, wherein the conversion table is obtained from previously collected experiment data.

5. The method for focusing by using a pre-flash according to claim 1, wherein the distance D to the object is calculated from an equation that represents the relationship between D, $Y_0$, and $\Delta Y$.

6. The method for focusing by using a pre-flash according to claim 5, wherein the equation is obtained from previously collected experiment data.

7. The method for focusing by using a pre-flash according to claim 1, further comprising obtaining a reflection ratio R of the third image for calculating the distance D to the object according to $Y_0$, $\Delta Y$ and the reflection ratio R.

8. The method for focusing by using a pre-flash according to claim 7, wherein the relationship between $Y_0$, $\Delta Y$, the reflection ratio R and the distance D to the object is obtained from previously collected experiment data.

9. The method for focusing by using a pre-flash according to claim 7, wherein the reflection ratio R is the ratio of the area in the third image having brightness greater than a predetermined value $Y_T$ to the whole area of the third image.

10. The method for focusing by using a pre-flash according to claim 9, wherein the predetermined value $Y_T$ is obtained from previously collected experiment data.

* * * * *